(12) United States Patent
Adams, Jr. et al.

(10) Patent No.: US 9,378,405 B2
(45) Date of Patent: Jun. 28, 2016

(54) DETERMINING BARCODE LOCATIONS IN DOCUMENTS

(71) Applicant: Kodak Alaris Inc., Rochester, NY (US)

(72) Inventors: James E. Adams, Jr., Rochester, NY (US); Jeffrey Clarence Snyder, Fairport, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/316,323

(22) Filed: Jun. 26, 2014

(65) Prior Publication Data

US 2015/0001303 A1    Jan. 1, 2015

Related U.S. Application Data

(60) Provisional application No. 61/840,541, filed on Jun. 28, 2013.

(51) Int. Cl.
| | |
|---|---|
| *G06K 9/32* | (2006.01) |
| *G06K 5/04* | (2006.01) |
| *G06K 7/14* | (2006.01) |
| *G06K 9/46* | (2006.01) |

(52) U.S. Cl.
CPC ............ *G06K 7/1443* (2013.01); *G06K 9/3233* (2013.01); *G06K 9/4604* (2013.01)

(58) Field of Classification Search
CPC ........................... G06K 7/1443; G06K 7/1447
USPC ................................ 235/462.08, 462.09, 462.1
See application file for complete search history.

(56) References Cited

U.S. PATENT DOCUMENTS

| | | | |
|---|---|---|---|
| 4,948,955 A |  | 8/1990 | Lee et al. |
| 4,988,852 A |  | 1/1991 | Krishnan |
| 5,304,787 A |  | 4/1994 | Wang |
| 5,438,636 A | * | 8/1995 | Surka ............................ 382/279 |
| 5,545,887 A | * | 8/1996 | Smith et al. .............. 235/462.08 |
| 5,974,200 A |  | 10/1999 | Zhou et al. |
| 6,082,619 A |  | 7/2000 | Ma et al. |
| 8,599,301 B2 | * | 12/2013 | Dowski et al. ................. 348/340 |
| 2005/0121520 A1 |  | 6/2005 | Yamaguchi et al. |

FOREIGN PATENT DOCUMENTS

EP    2093697    8/2009

OTHER PUBLICATIONS

International Preliminary Report on Patentability dated Jan. 7, 2016 in corresponding PCT application No. PCT/US2014/044353.
International Search Report and Written Opinion dated Nov. 10, 2014 in corresponding PCT application No. PCT/US2014/044353.

* cited by examiner

*Primary Examiner* — Daniel St Cyr
(74) *Attorney, Agent, or Firm* — Hogan Lovells US LLP

(57) ABSTRACT

A method of producing barcode locations within a document comprising providing an original digital image of the document; using a processor for producing a normalized image from the original digital image; producing a gradient image from the normalized image; producing a plurality of bounding boxes from the gradient image; and producing bounding box test results by testing each bounding box for the presence of a barcode; and producing barcode locations within the document from the bounding box test results.

13 Claims, 3 Drawing Sheets

DETERMINING BARCODE LOCATIONS IN DOCUMENTS

CROSS REFERENCE TO RELATED APPLICATIONS

This application is a non-provisional of U.S. Provisional Patent Application No. 61/840,541, filed Jun. 28, 2013, entitled DETERMINING BARCODE LOCATIONS IN DOCUMENTS, which is hereby incorporated by reference in its entirety.

FIELD OF THE INVENTION

This invention pertains to the field of producing barcode locations within a document and more particularly to a method for detecting and locating barcodes in order to produce improved barcode regions within a document.

BACKGROUND OF THE INVENTION

Detection of the presence and location of a barcode within a document is generally the first step in the well known task of reading barcodes. Commonly assigned U.S. Pat. No. 4,948,955 to Lee et al., entitled "Barcode Location Determination," describes detecting a barcode of a known size and orientation by producing a reduced resolution map of candidate regions in the document via connected component analysis and testing each candidate region by computing moment-based features such as centroid location, area, major axis length and minor axis length. The problems with this approach are the inability to detect barcodes of unknown sizes and orientations and the complexity of the image processing operations performed, e.g., connected component analysis, requiring extensive computational resources. Commonly assigned U.S. Pat. No. 4,988,852 to Krishnan, entitled "Bar Code Reader," produces candidate barcode regions within the document by detecting areas of one-dimensional black to white transitions appropriate for barcodes. The boundaries of the candidate regions are subsequently refined using morphological operations. The problem with this approach is the inability to detect two-dimensional barcode types that do not exhibit the long solid bars and spaces typical of one-dimensional barcode types. Commonly assigned U.S. Pat. No. 5,304,787 to Wang, entitled "Locating 2-D Bar Codes," is representative of the approach of searching the document for the presence of specific start and stop codes associated with a particular barcode type. The problems with this approach are that only the barcode types associated with the given start and stop codes can be determined and that the search for start and stop codes is very sensitive to the scale (size) of the barcode, requirement multiple searches of the document using a variety of scale factors. These multiple passes significantly increases the execution time of the barcode detection process. Commonly assigned U.S. Pat. No. 5,974,200 to Zhou et al., entitled "Method of Locating a Machine Readable Two Dimensional Barcode within an Image," produces candidate barcode regions within the document by detecting areas of two-dimensional black to white checkerboard-like patterns appropriate for barcodes. The problem with this approach is the inability to detect barcode types that do not contain such checkerboard features.

SUMMARY OF THE INVENTION

There remains a need for a fast and robust technique for producing barcode locations within a document that avoids using extensive computational resources, locates both one-dimensional and two-dimensional barcodes simultaneously, does not require a priori knowledge of the barcode type, and rapidly terminates if no barcodes are present in the document.

The present invention represents a method of producing barcode locations within a document comprising:
   providing an original digital image of the document;
   using a processor for:
      producing a normalized image from the original digital image;
      producing a gradient image from the normalized image;
      producing a plurality of bounding boxes from the gradient image; and
      producing bounding box test results by testing each bounding box for the presence of a barcode; and
   producing barcode locations within the document from the bounding box test results.

The present invention has the advantage that it identifies barcode locations with only two simple tests without regard to the type of barcode present. It correspondingly executes quickly without the need for extensive computation resources.

The present invention has the additional advantage that it locates both one-dimensional and two-dimensional barcodes simultaneously.

The present invention has the additional advantage that it requires no information about the particular features of any given barcode type.

The present invention has the additional advantage that it does not require that the presence of a barcode be known in the document being processed. If no barcode is present the invention will conclude its tests quickly without use of extensive computing resources.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the signals involved therewith, not specifically shown or described herein can be selected from such systems, algorithms, components, and elements known in the art. Given the system as described according to the invention in the following, software not specifically shown, suggested, or described herein that is useful for implementation of the invention is conventional and within the ordinary skill in such arts.

Figure 1:
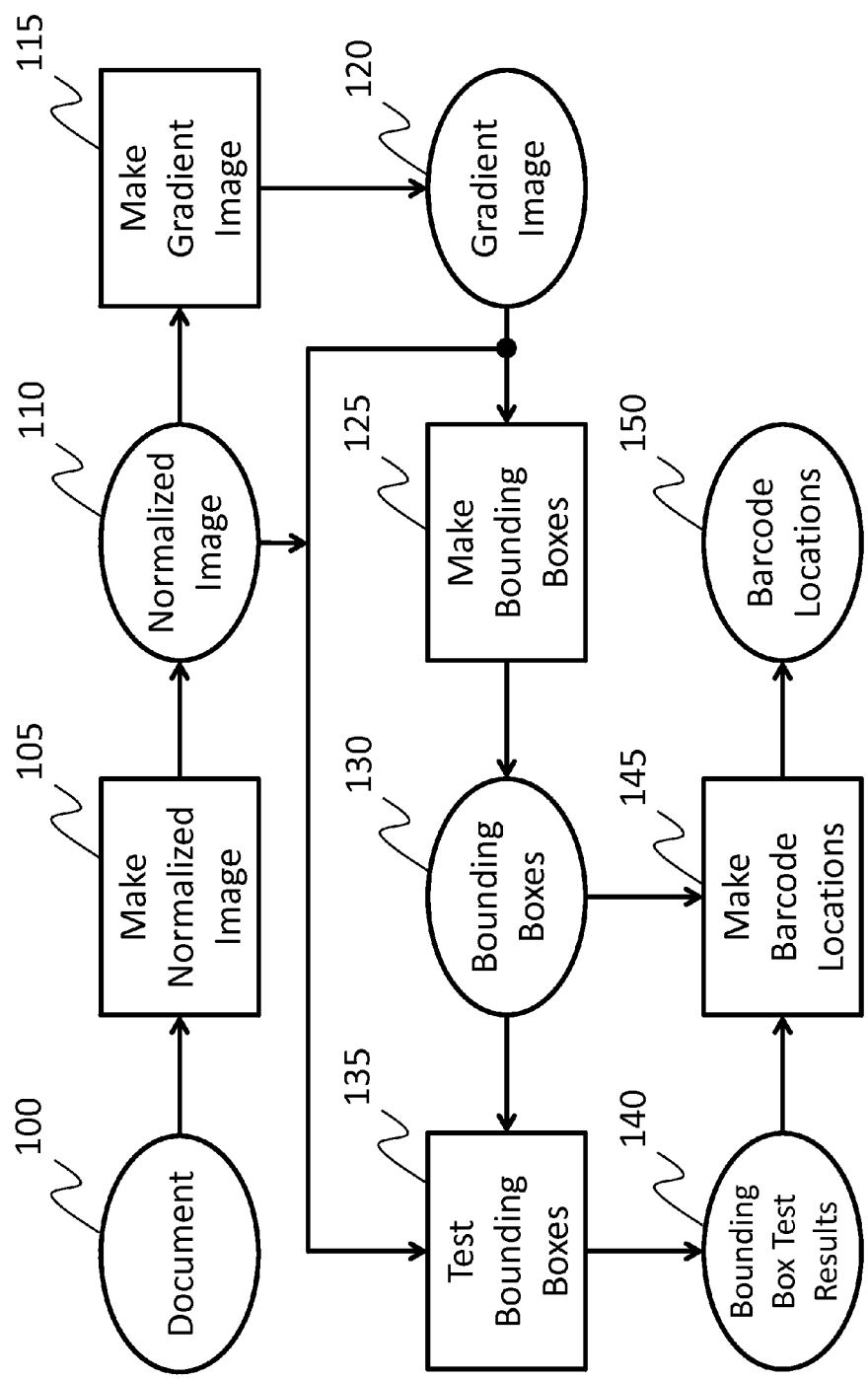
FIG. 1 is a block diagram of the preferred embodiment of the present invention.

FIG. 1 is a block diagram of a preferred embodiment of the present invention. A make normalized image block 105 produces a normalized image 110 from a document 100. The document 100 is a digital image produced in a number of ways known to those skilled in the art, such as with a scanner or a camera. A make gradient image block 115 produces a gradient image 120 from the normalized image 110. A make bounding boxes block 125 produces one or more bounding boxes 130 from the gradient image 120. A test bounding boxes block 135 produces bounding box test results 140 from the normalized image 110 and the gradient image 120 for each of the bounding boxes 130. A make barcode locations block 145 produces one or more barcode locations 150 from the bounding boxes 130 and the bounding box test results 140.

In FIG. 1, the make normalized image block 105 produces the normalized image 110 by first converting the document 100 to a grayscale image and then performing a full-scale histogram stretch on the grayscale image. The conversion to a grayscale image operation combines the color components of the document 100 to produce a gray component at each location in the document 100. One example of this operation is $$\text{gray} = k_{red} \times \text{red} + k_{green} \times \text{green} + k_{blue} \times \text{blue}$$

where red, green, and blue are the color values at the document location, $k_{red}$, $k_{green}$, and $k_{blue}$ are weighting coefficients, and gray is the output grayscale value. Typical weighting coefficient values are $k_{red}$=0.25, $k_{green}$=0.5, and $k_{blue}$=0.25. Other possible weighting coefficient values will be well known to those skilled in the art. The full-scale histogram stretch operation begins by finding the minimum and maximum grayscale values in the grayscale image. These extreme values are then used to stretch the range of grayscale values to extending across a standard range, for example 0 to 255. One example of this operation when the standard range is 0 to 255 is $$\text{gray}_{stretched} = 255 \times ((\text{gray} - \text{gray}_{min})/(\text{gray}_{max} - \text{gray}_{min}))$$

where gray is the input grayscale value, $\text{gray}_{min}$ is the minimum grayscale value, $\text{gray}_{max}$ is the maximum grayscale value, and $\text{gray}_{stretched}$ is the output full-range histogram stretched value. In an alternate embodiment, instead of finding the minimum and maximum grayscale values a histogram of the grayscale image is computed. Using a method well known to those skilled in the art as histogram penetration, $\text{gray}_{min}$ is set to the grayscale value corresponding to some small percent of the histogram energy and $\text{gray}_{max}$ is set to the grayscale value corresponding to some large percent of the histogram energy. As examples, $\text{gray}_{min}$ can be set to correspond to 5% of the cumulative histogram energy and $\text{gray}_{max}$ can be set to correspond to 95% of the cumulative histogram energy. Using the histogram stretched values for $\text{gray}_{min}$ and $\text{gray}_{stretched}$ is computed as before. Since $\text{gray}_{stretch}$ can now exceed the standard range due to the histogram penetration, $\text{gray}_{stretch}$ is clipped to the standard range after the stretching computation, as shown below $$\text{gray}_{stretched} = [255 \times ((\text{gray} - \text{gray}_{min})/(\text{gray}_{max} - \text{gray}_{min}))]_0^{255}$$

Figure 2:
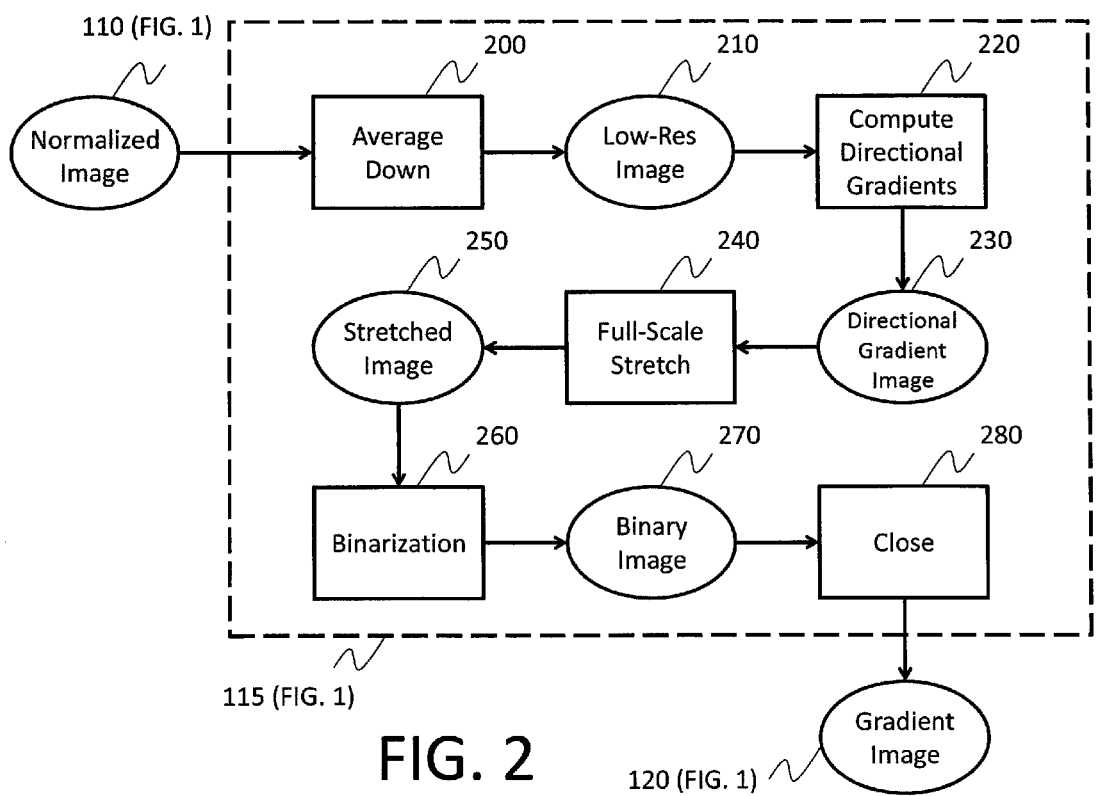
FIG. 2 is a block diagram showing additional details of the make gradient image block in FIG. 1.

FIG. 2 is a detailed diagram of the make gradient image block 115 (FIG. 1). An average down block 200 produces a low-res image 210 from the normalized image 110 (FIG. 1). A compute directional gradients block 220 produces a directional gradient image 230 from the low-res image 210. A full-scale stretch block 240 produces a stretched image 250 from the directional gradient image 230. A binarization block 260 produces a binary image 270 from the stretched image 250. A close block 280 produces the gradient image 120 (FIG. 1) from the binary image 270.

In FIG. 2, the average down block 200 first blurs the normalized image with a 5×5 boxcar filter (averaging all the normalized image values within a 5×5 square region) to produce a blurred normalized image and then subsamples the blurred normalized image by a factor of four in both the horizontal and vertical directions to produce the low-res image 210. The compute directional gradients block 220 computes the absolute differences between adjacent pixel values in the low-res image 210 for a given direction. Typically the given direction is horizontal, vertical, or one of the two diagonal directions. The absolute differences are then clipped to a standard range, such as 0 to 255, and then blurred using a 5×5 boxcar filter to produce the directional gradient image 230. The full-scale stretch block 240 computes the minimum and maximum values of the directional gradient image 230 and uses them to compute the stretched image 250. If the standard range is 0 to 255 then $$\text{grad}_{stretched} = 255 \times ((\text{grad} - \text{grad}_{min})/(\text{grad}_{max} - \text{grad}_{min}))$$

where grad is the directional gradient image value, $\text{grad}_{min}$ and $\text{grad}_{max}$ are the extreme values and $\text{grad}_{stretched}$ in the stretched image value. The binarization block 260 computes a histogram of the stretched image 250 and then determines a binarization threshold equal to the stretched image value corresponding to 80% of the cumulative histogram energy. The binarization threshold is applied to the stretched image 250 to produce the binary image 270. Finally, the close block 280 performs a morphological close operation using a 3×3 structuring element to the binary image 270 to produce the gradient image 120 (FIG. 1).

In FIG. 1, the make bounding boxes block 125 scans the gradient image 120 for a first white pixel where it is assumed that white pixels correspond to edges in the document 100 and black pixels corresponding to flat regions in the document 100. From the first white pixel a box is expanded until a first black pixel horizontally and a first black pixel vertically are reached. The resulting box becomes a starting bounding box. The starting bounding box is then improved using a standard method known to those skilled in the art as rotating calipers. In the rotating calipers process each side of the box is sequentially adjusted to produce the tightest fitting box around the cluster of connected white pixels in question. The result is an expanded bounding box. The coordinates of the expanded bound box are added to the list of bounding boxes 130. Once the expanded bounding box location is identified, the make bounding boxes block 125 continues scanning the gradient image 120 for the next white pixel not containing in a previously identified bounding boxes 130 until the gradient image 120 has been fully scanned.

In FIG. 1, the test bounding boxes block 135 tests each bounding box location within the normalized image 110 from the bounding boxes 130 for the presence of pixel values of both extremes of the standard range. For example, if the standard range is 0 to 255, then the test bounding boxes block 135 checks for the presence of both pixel values 0 and 255 within the bounding box. If one or both of these pixel values is missing, then the bounding box is rejected as a possible barcode location. If both extreme pixel values are found then the test bounding boxes block 135 compares the number of black pixels to the number of white pixels in the bounding box in the gradient image 120. If more than 10% of the pixels are black then the bounding box is rejected as a possible barcode location. (As a result of the close block 280 (FIG. 2) operation, an ideal barcode would become a solid block of white pixels.) The results of both test become the bounding box test results 140. The make barcode locations block 145 produces a list of barcode locations 150 from the bounding boxes 130 that pass both of the bounding box test results 140.

Figure 3:
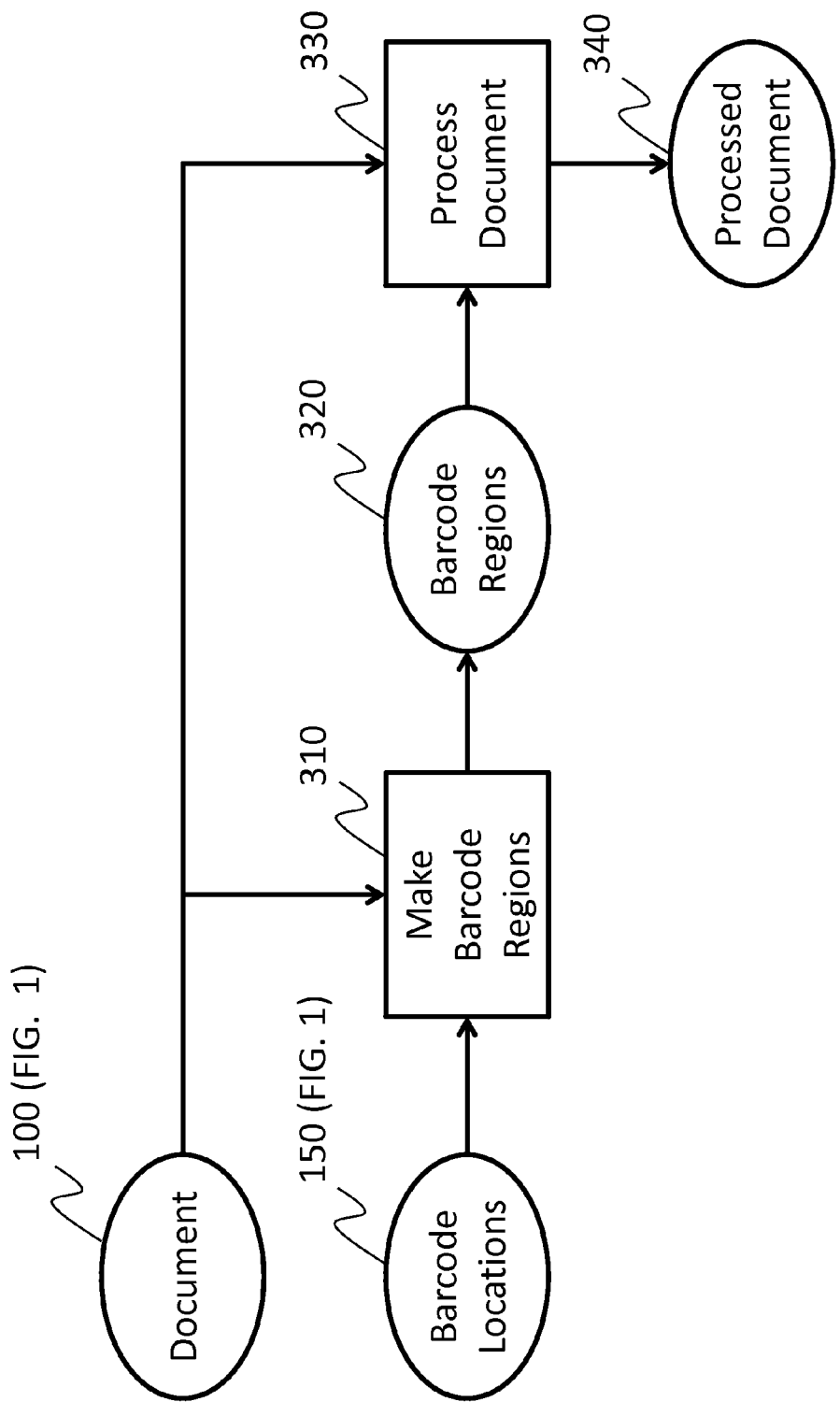
FIG. 3 is a block diagram of an alternate embodiment of the present invention.

FIG. 3 is a block diagram of an alternate embodiment of the present invention. A make barcode regions block 310 produces barcode regions 320 from the document 100 (FIG. 1) and the barcode locations 150 (FIG. 1). A process document block 330 produces a processed document 340 from the document 100 (FIG. 1) and the barcode regions 320.

In FIG. 3, the make barcode regions block 310 identifies the barcode locations 150 (FIG. 1) within the document 100 (FIG. 1) in such a manner that subsequent document processing can be performed differently within the barcode regions 320 than in the rest of the document 100 (FIG. 1). This is based on observation that other types of document content, such as text, graphics, or pictures, are sufficiently dissimilar to barcodes to benefit from different types of processing. Examples of different processing would be sharpening the barcode regions 320 differently from the non barcode regions. Another important example is to restrict subsequent document processing to only non barcode regions. The process document block 330 performs the according different document processing operations to produce the processed document 340.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 100 document
105 make normalized image block
110 normalized image
115 make gradient image block
120 gradient image
125 make bounding boxes block
130 bounding boxes
135 test bounding boxes block
140 bounding box test results
145 make barcode locations block
150 barcode locations
200 average down block
210 low-res image
220 compute directional gradients block
230 directional gradient image
240 full-scale stretch block
250 stretched image
260 binarization block
270 binary image
280 close block
310 make barcode regions block
320 barcode regions
330 process document block
340 processed document

The invention claimed is:

1. A method of producing barcode locations within a document comprising:
   (a) providing an original digital image of the document;
   (b) using a processor for:
      (i) producing a normalized image from the original digital image, including producing a grayscale image from the original digital image and producing a full-scale histogram stretched image from the grayscale image;
      (ii) producing a gradient image from the normalized image;
      (iii) producing a plurality of bounding boxes from the gradient image; and
      (iv) producing bounding box test results by testing each bounding box for the presence of a barcode; and
   (c) producing barcode locations within the document from the bounding box test results.

2. The method of claim 1 further including using histogram penetration to produce the full-scale histogram stretched image.

3. The method of claim 1 wherein producing a gradient image includes producing a downsampled image from the normalized image and a directional gradient image from the downsampled image.

4. The method of claim 3 further including using histogram stretching and thresholding on the directional gradient image to produce the gradient image.

5. The method of claim 1 wherein producing a plurality of bounding boxes includes finding minimum bounding boxes around each feature in the gradient image.

6. The method of claim 1 wherein producing bounding box test results includes, for each bounding box region within the normalized image, testing for the presence of a minimum barcode pixel value and a maximum barcode pixel value.

7. The method of claim 1 wherein producing bounding box test results includes, for each bounding box region within the gradient image, computing a barcode black pixel ratio and comparing it to a barcode black pixel ratio threshold value.

8. A method of producing improved barcode regions within a document comprising:
   (a) providing an original digital image of the document;
   (b) using a processor for:
      (i) producing a normalized image from the original digital image, including producing a grayscale image from the original digital image and producing a full-scale histogram stretched image from the grayscale image;
      (ii) producing a gradient image from the normalized image;
      (iii) producing a plurality of bounding boxes from the gradient image; and
      (iv) producing bounding box test results by testing each bounding box for the presence of a barcode;
   (c) producing barcode locations within the document from the bounding box test results;
   (d) producing barcode regions within the document from the barcode locations; and
   (e) producing improved barcode regions from the barcode regions.

9. The method of claim 8 wherein producing improved barcode regions further includes processing the barcode regions differently from the rest of the document.

10. The method of claim 9 further including not processing the barcode regions as the document is processed.

11. A method of producing barcode locations within a document comprising:

(a) providing an original digital image of the document;
(b) using a processor for:
   (i) producing a normalized image from the original digital image;
   (ii) producing a gradient image from the normalized image, including producing a downsampled image from the normalized image and a directional gradient image from the downsampled image;
   (iii) producing a plurality of bounding boxes from the gradient image; and
   (iv) producing bounding box test results by testing each bounding box for the presence of a barcode; and
(c) producing barcode locations within the document from the bounding box test results.

12. A method of producing barcode locations within a document comprising:
(a) providing an original digital image of the document;
(b) using a processor for:
   (i) producing a normalized image from the original digital image;
   (ii) producing a gradient image from the normalized image;
   (iii) producing a plurality of bounding boxes from the gradient image; and
   (iv) producing bounding box test results by testing each bounding box for the presence of a barcode, including, for each bounding box region within the normalized image, testing for the presence of a minimum barcode pixel value and a maximum barcode pixel value; and
(c) producing barcode locations within the document from the bounding box test results.

13. A method of producing barcode locations within a document comprising:
(a) providing an original digital image of the document;
(b) using a processor for:
   (i) producing a normalized image from the original digital image;
   (ii) producing a gradient image from the normalized image;
   (iii) producing a plurality of bounding boxes from the gradient image; and
   (iv) producing bounding box test results by testing each bounding box for the presence of a barcode, including, for each bounding box region within the gradient image, computing a barcode black pixel ratio and comparing it to a barcode black pixel ratio threshold value; and
(c) producing barcode locations within the document from the bounding box test results.

* * * * *